US012656496B2

(12) United States Patent
Cohen

(10) Patent No.: US 12,656,496 B2
(45) Date of Patent: Jun. 16, 2026

(54) COHERENT SENSING SYSTEM USING A DOE

(71) Applicant: APPLE INC., Cupertino, CA (US)

(72) Inventor: Noam Cohen, Jerusalem (IL)

(73) Assignee: Apple Inc., Cupertino, CA (US)

( * ) Notice: Subject to any disclaimer, the term of this patent is extended or adjusted under 35 U.S.C. 154(b) by 1005 days.

(21) Appl. No.: 17/838,217

(22) Filed: Jun. 12, 2022

(65) Prior Publication Data

US 2023/0400582 A1 Dec. 14, 2023

(51) Int. Cl.
G01S 17/89 (2020.01)
G01S 7/481 (2006.01)
(Continued)

(52) U.S. Cl.
CPC ............ G01S 17/89 (2013.01); G01S 7/4816 (2013.01); G02B 5/3083 (2013.01); G02B 27/283 (2013.01); G02B 27/4233 (2013.01)

(58) Field of Classification Search
CPC ...... G01S 17/89; G01S 7/4816; G01S 7/4812; G01S 7/499; G01S 17/34; G02B 5/3083; G02B 27/283; G02B 27/4233
See application file for complete search history.

(56) References Cited

U.S. PATENT DOCUMENTS 6,424,407 B1 * 7/2002 Kinrot ................... G01S 7/4811
356/28
9,529,079 B1 12/2016 Droz et al.
(Continued)

FOREIGN PATENT DOCUMENTS

CN 109541619 A 3/2019
CN 115605774 A 1/2023
(Continued)

OTHER PUBLICATIONS

Vasilyev, "The Optoelectronic Swept-Frequency Laser and Its Applications in Ranging, Three-Dimensional Imaging, and Coherent Beam Combining of Chirped-Seed Amplifiers," Doctoral Thesis, California Institute of Technology, pp. 1-177, year 2013.
(Continued)

*Primary Examiner* — Yuqing Xiao
(74) *Attorney, Agent, or Firm* — Meitar Patents LTD.; Daniel Kligler

(57) ABSTRACT

Range sensing apparatus includes a radiation source, which emits a beam of coherent optical radiation, and an array of optical detectors. A beamsplitter directs the beam toward a target while directing the optical radiation reflected from the target toward the array of optical detectors. A DOE diffracts the beam into multiple orders, including a zero order, propagating toward the target at different, respective angles. A reflector intercepts and reflects at least a part of the zero order toward the beamsplitter, thereby generating a local beam, which is reflected by the beamsplitter toward the array of optical detectors. Objective optics image the target onto the array of optical detectors while spreading the local beam across the array. Processing circuitry extracts a beat signal from electrical signals output by the optical detectors in response to an optical interference between the optical radiation reflected from the target and the local beam.

20 Claims, 2 Drawing Sheets

(51) Int. Cl.
| | |
|---|---|
| *G02B 5/30* | (2006.01) |
| *G02B 27/28* | (2006.01) |
| *G02B 27/42* | (2006.01) |

(56) References Cited

U.S. PATENT DOCUMENTS

| | | | | |
|---|---|---|---|---|
| 9,971,948 | B1 | 5/2018 | Herrington et al. | |
| 10,018,723 | B2 | 7/2018 | Sromin et al. | |
| 10,908,267 | B1 * | 2/2021 | Gagne | G01S 7/4813 |
| 2006/0227316 | A1 * | 10/2006 | Gatt | G01S 7/4811 |
| | | | | 356/5.11 |
| 2013/0206963 | A1 * | 8/2013 | Grund | G02B 27/10 |
| | | | | 359/489.08 |
| 2013/0208258 | A1 | 8/2013 | Eisele et al. | |
| 2017/0172510 | A1 | 6/2017 | Homyk et al. | |
| 2017/0285325 | A1 | 10/2017 | Erlich et al. | |
| 2017/0299698 | A1 * | 10/2017 | Yagi | G01S 7/4814 |
| 2017/0322015 | A1 * | 11/2017 | Knüttel | G03H 1/0443 |
| 2019/0025426 | A1 | 1/2019 | Satyan et al. | |
| 2020/0234785 | A1 | 7/2020 | Kyselov et al. | |
| 2020/0257128 | A1 * | 8/2020 | Sakai | G01S 7/4814 |
| 2021/0031119 | A1 | 2/2021 | Clements | |
| 2021/0109197 | A1 | 4/2021 | O'Keeffe | |
| 2021/0165083 | A1 | 6/2021 | Fine et al. | |
| 2021/0257396 | A1 | 8/2021 | Piggott et al. | |
| 2021/0314734 | A1 | 10/2021 | Mehta et al. | |
| 2021/0341611 | A1 | 11/2021 | Boloorian | |
| 2021/0382153 | A1 | 12/2021 | Dielacher et al. | |
| 2021/0405164 | A1 | 12/2021 | Klemme et al. | |
| 2022/0043108 | A1 | 2/2022 | Lavian | |
| 2022/0050201 | A1 | 2/2022 | Sun et al. | |
| 2022/0075076 | A1 | 3/2022 | Michaels et al. | |
| 2022/0091242 | A1 | 3/2022 | Gagne et al. | |
| 2022/0113379 | A1 | 4/2022 | Viswanatha et al. | |
| 2022/0187457 | A1 | 6/2022 | Daami et al. | |
| 2022/0404475 | A1 | 12/2022 | Laflaquiere et al. | |
| 2023/0393241 | A1 | 12/2023 | Barragan et al. | |
| 2024/0288552 | A1 | 8/2024 | Milgrome et al. | |

FOREIGN PATENT DOCUMENTS

| | | | |
|---|---|---|---|
| CN | 115932888 | A | 4/2023 |
| DE | 102020213161 | A1 | 4/2022 |
| EP | 3961257 | A1 | 3/2022 |
| EP | 3971614 | A1 | 3/2022 |
| ES | 2896302 | T3 | 2/2022 |
| WO | 2015098288 | A1 | 7/2015 |
| WO | 2018102190 | A1 | 6/2018 |
| WO | 2020161260 | A1 | 8/2020 |
| WO | 2020190338 | A1 | 9/2020 |
| WO | 2022168500 | A1 | 8/2022 |
| WO | 2023012527 | A1 | 2/2023 |

OTHER PUBLICATIONS

International Application # PCT/US2023/084979 Search Report dated Mar. 12, 2024.
Kamali et al., "A review of dielectric optical metasurfaces for wavefront control," Nanophotonics, Open Access, pp. 1-84, May 18, 2018.
Xiong et al., "Controlling the degrees of freedom in metasurface designs for multi-functional optical devices," Nanoscale Advances, vol. 1, pp. 3786-3806, year 2019.
Wikipedia, "Laser speckle contrast imaging," pp. 1-8, last edited Dec. 12, 2023.
Li et al., "Transmissive-detected laser speckle contrast imaging for blood flow monitoring in thick tissue: ," from Monte Carlo simulation to experimental demonstration, Nature, Light: Science & Applications, vol. 10, article No. 241, pp. 1-43, Dec. 3, 2021.
Heeman et al., "Clinical applications of laser speckle contrast imaging: a review," Journal of Biomedical Optics, vol. 24, No. 8, pp. 080901-1-80901-11, Aug. 2019.

Zalevsky et al., "Simultaneous remote extraction of multiple speech sources and heart beats from secondary speckles pattern," Optics Express, vol. 17, No. 24, pp. 1-15, Nov. 23, 2009.
Kendrisic et al., "Thermally Tuned VCSEL-Based SS-OCT System," Biophotonics Congress: Biomedical Optics (Translational, Microscopy, OCT, OTS, Brain), Optica Publishing Group, pp. 1-2, year 2022.
Axelrod et al., "Reconfigurabe Quasi-Resonance Scanner for 3D FMCW Imaging," Optics Letters, vol. 39, issue 16, pp. 4776-4779, year 2014.
Northcott et al., U.S. Appl. No. 18/094,999, filed Jan. 10, 2023.
Shnaiderman et al., U.S. Appl. No. 18/094,997, filed Jan. 10, 2023.
Shnaiderman et al., U.S. Appl. No. 18/314,843, filed May 10, 2023.
Oggier et al., U.S. Appl. No. 18/113,104, filed Feb. 23, 2023.
Wang, "Investigation of New Concepts and Solutions for Silicon Nanophotonics," Doctoral Thesis in Microelectronics and Applied Physics, Stockholm, Sweden, pp. 1-91, year 2010.
Sacher et al., "Wide Bandwidth and High Coupling Efficiency Si3N4-on-SOI Dual-level Grating Coupler," Optics Express, vol. 22, No. 9, pp. 1-10, May 5, 2014.
Rogers et al., "A Universal 3D Imaging Sensor on a Silicon Photonics Platform," ArXiv:2008.02411v3, pp. 1-18, Nov. 11, 2020.
Lumerical Inc., "Tutorial—Splitter Optimization," pp. 1-8, year 2019, as downloaded from https://lumopt.readthedocs.io/en/latest/tutorial.html.
Nicolaescu et al., "3D Imaging via Silicon-photonics-based LIDAR," Proc. SPIE vol. 11691, Silicon Photonics XVI, pp. 1-12, year 2021.
Marchetti et al., "Coupling Strategies for Silicon Photonics Integrated Chips [Invited]," Photonics Reseach, vol. 7, No. 2, pp. 1-39, Feb. 2019.
Marchetti et al., "High-efficiency Grating-couplers: Demonstration of a New Design Strategy," Springer Nature, Scientific Reports, vol. 7, pp. 1-9, Nov. 2017.
Hooten et al., "Inverse Design of Grating Couplers Using the Policy Gradient Method from Reinforcement Learning," De Gruyter, Nanophotonics, vol. 10, issue 15, pp. 3843-3856, year 2021.
Michaels, "A Hierarchical Approach to the Design and Optimization of Photonics," PhD Thesis, University of California, Berkeley, pp. 1-139, year 2019.
Molesky, "Outlook for Inverse Design in Nanophotonics," arXiv:1801.06715v1, pp. 1-13, Jan. 20, 2018.
International Application # PCT/US2023/066803 Search Report dated Jul. 27, 2023.
Ding et al., "Compensation of Laser Frequency Tuning Nonlinearity of a Long Range OFDR Using Deskew Filter," Optics Express, vol. 21, No. 3, pp. 3826-3834, Feb. 11, 2013.
Du et al., "Method for Improving Spatial Resolution and Amplitude by Optimized Deskew Filter in Long-Range OFDR," IEEE Photonics Journal, vol. 6, No. 5, pp. 1-13, Oct. 2014.
Sandborn, "FMCW Lidar: Scaling to the Chip-Level and Improving Phase-Noise-Limited Performance," Dissertation, Electrical Engineering and Computer Sciences, University of California at Berkeley, USA, pp. 1-90, Dec. 1, 2019.
Meta et al., "Signal Processing for FMCW SAR," IEEE Transactions on Geoscience and Remote Sensing, voume 45, No. 11, pp. 3519-3532, Nov. 2007.
Peek, "Estimation and Compensation of Frequency Sweep Nonlinearity in FMCW Radar," M.Sc. thesis in Applied Mathematics, The University of Twente, The Netherlands, pp. 1-67, Sep. 2011.
Meta et al., "Range Non-Linearities Correction in FMCW SAR," IEEE, pp. 403-406, year 2006.
Baumann et al., "Speckle Phase Noise in Coherent Laser Ranging: Fundamental Precision Limitations," Optics Letters, vol. 39, issue 16, pp. 4776-4779, Aug. 15, 2014.
Islam et al., U.S. Appl. No. 17/577,039, filed Jan. 17, 2022.
Islam et al., U.S. Appl. No. 17/742,419, filed May 12, 2022.
Islam et al., U.S. Appl. No. 17/863,419, filed Jul. 13, 2022.
Ma et al, "Self-Supervised Sparse-to-Dense: Self-Supervised Depth Completion from LiDAR and Monocular Camera", 2019 International Conference on Robotics and Automation(ICRA), Aug. 12, 2019, pp. 1-12.
Huang, Frequency-modulated continuous-wave 3D imaging with high photon efficiency Huang, Jul. 12, 2022, vol. 47, pp. 3568-3571.

(56)           References Cited

OTHER PUBLICATIONS

Non-Final Office Action, U.S. Appl. No. 18/759,249, Dated Jul. 23, 2025.
Japanese Office Action, Application # 2024-115446, dated Jun. 2, 2025.
Japanese Office Action, Application # 2024-115446, dated Oct. 14, 2025.
Non-Final Office Action U.S. Appl. No. 17/863,419, dated Aug. 12, 2025.

* cited by examiner

COHERENT SENSING SYSTEM USING A DOE

FIELD OF THE INVENTION

The present invention relates generally to systems and methods for optical sensing, and particularly to LiDAR depth sensing.

BACKGROUND

In certain frequency-modulated continuous-wave (FMCW) LiDAR sensing arrangements, a radio-frequency (RF) chirp is applied to modulate the frequency of a beam of coherent light (typically a single-mode laser beam) that is directed toward a target. The light reflected from the target is mixed with a sample of the transmitted light (referred to as the local beam or local oscillator (LO)) and detected by a photodetector, such as a balanced photodiode pair. The photodetector outputs an RF signal at a beat frequency that is proportional to the range of the target.

When the target is moving, the resulting Doppler shift of the reflected light will cause the beat frequency to increase or decrease, depending on the direction of motion. By comparing the beat frequencies obtained from chirps of positive and negative slopes, it is thus possible to extract both the range and the velocity of the target. In the ideal case, if the beat frequency due to the Doppler shift is d, and the beat frequency due to the chirp and range is r, then the measured beat frequency for the up-chirp will be $f_u = d+r$, and the beat frequency on the down-chirp will be $f_d = d-r$. Thus, the sum of the measured up and down chirp frequencies reveals the Doppler shift, and the difference the range.

SUMMARY

Embodiments of the present invention that are described hereinbelow provide improved methods and devices for LiDAR sensing.

There is therefore provided, in accordance with an embodiment of the invention, range sensing apparatus, including a radiation source, configured to emit a beam of coherent optical radiation, and an array of optical detectors. A beamsplitter is positioned to direct the beam toward a target while directing the optical radiation reflected from the target toward the array of optical detectors. A diffractive optical element (DOE) is configured to diffract the beam into multiple orders, including a zero order, propagating toward the target at different, respective angles. A reflector is configured to intercept and reflect at least a part of the zero order toward the beamsplitter, thereby generating a local beam, which is reflected by the beamsplitter toward the array of optical detectors. Objective optics are configured to image the target onto the array of optical detectors while spreading the local beam across the array. Processing circuitry is configured to extract a beat signal from electrical signals output by the optical detectors in response to an optical interference between the optical radiation reflected from the target and the local beam.

In some embodiments, a frequency modulation is applied to the coherent optical radiation emitted by the radiation source, and the beat signal is indicative of a frequency difference between the coherent optical radiation reflected from the target and the local beam. In a disclosed embodiment, the processing circuitry is configured to analyze the beat signal to find a range of the target.

In some embodiments, the beamsplitter includes a beamsplitter cube, wherein the radiation source is configured to direct the optical radiation into the beamsplitter cube through a first face of the beamsplitter cube, whereby the optical radiation exits the beamsplitter cube toward the target through a second face of the beamsplitter cube, and the array of optical detectors is configured to receive the optical radiation that has been reflected from the target, entered the beamsplitter cube through the second face, and exited through a third face of the beamsplitter cube.

In one embodiment, the DOE is positioned between the radiation source and the beamsplitter cube and is configured to direct the multiple orders into the beamsplitter cube. The DOE may be mounted on the first face of the beamsplitter cube.

Alternatively, the DOE is positioned to diffract the beam into the multiple orders after the beam has passed through the first and second faces of the beamsplitter cube.

In a disclosed embodiment, the beamsplitter cube includes a polarizing internal beamsplitting surface, and the apparatus includes a quarter-wave plate having an inner side mounted on the second face of the beamsplitter cube, and the reflector is disposed on an outer side of the quarter-wave plate.

In some embodiments, the reflector has an angular extent selected so as to intercept only the zero order, while the remaining orders pass outside the angular extent of the reflector.

Additionally or alternatively, the DOE is further configured to collimate the beam of optical radiation.

In one embodiment, the reflector is partially reflective, whereby a portion of the zero order passes through the reflector toward the target.

In some embodiments, the objective optics include a central zone, which is configured to spread the local beam across the array, and a peripheral zone, surrounding the central zone, which is configured to image the target onto the array. In one embodiment, the central zone includes a further DOE, which may be configured to apply a top-hat profile to the local beam. Alternatively or additionally, the central zone includes a diffuser. Further alternatively or additionally, the peripheral zone includes a first lens with a first focal power, wherein the central zone includes a second lens with a second focal power, different from the first focal power.

There is also provided, in accordance with an embodiment of the invention, a method for optical sensing, which includes directing a beam of coherent optical radiation toward a beamsplitter. The beamsplitter to positioned direct the beam toward a target while directing the optical radiation reflected from the target toward the array of optical detectors. A diffractive optical element (DOE) is applied to diffract the beam into multiple orders, including a zero order, propagating toward the target at different, respective angles. At least a part of the zero order is intercepted and deflected toward the beamsplitter, thereby generating a local beam, which is directed by the beamsplitter toward an array of optical detectors. The target is imaged through the beamsplitter onto the array of optical detectors while spreading the local beam across the array. A beat signal is extracted from electrical signals output by the optical detectors in response to an optical interference between the optical radiation reflected from the target and the local beam.

The present invention will be more fully understood from the following detailed description of the embodiments thereof, taken together with the drawings in which:

DETAILED DESCRIPTION OF EMBODIMENTS

Figure 1:
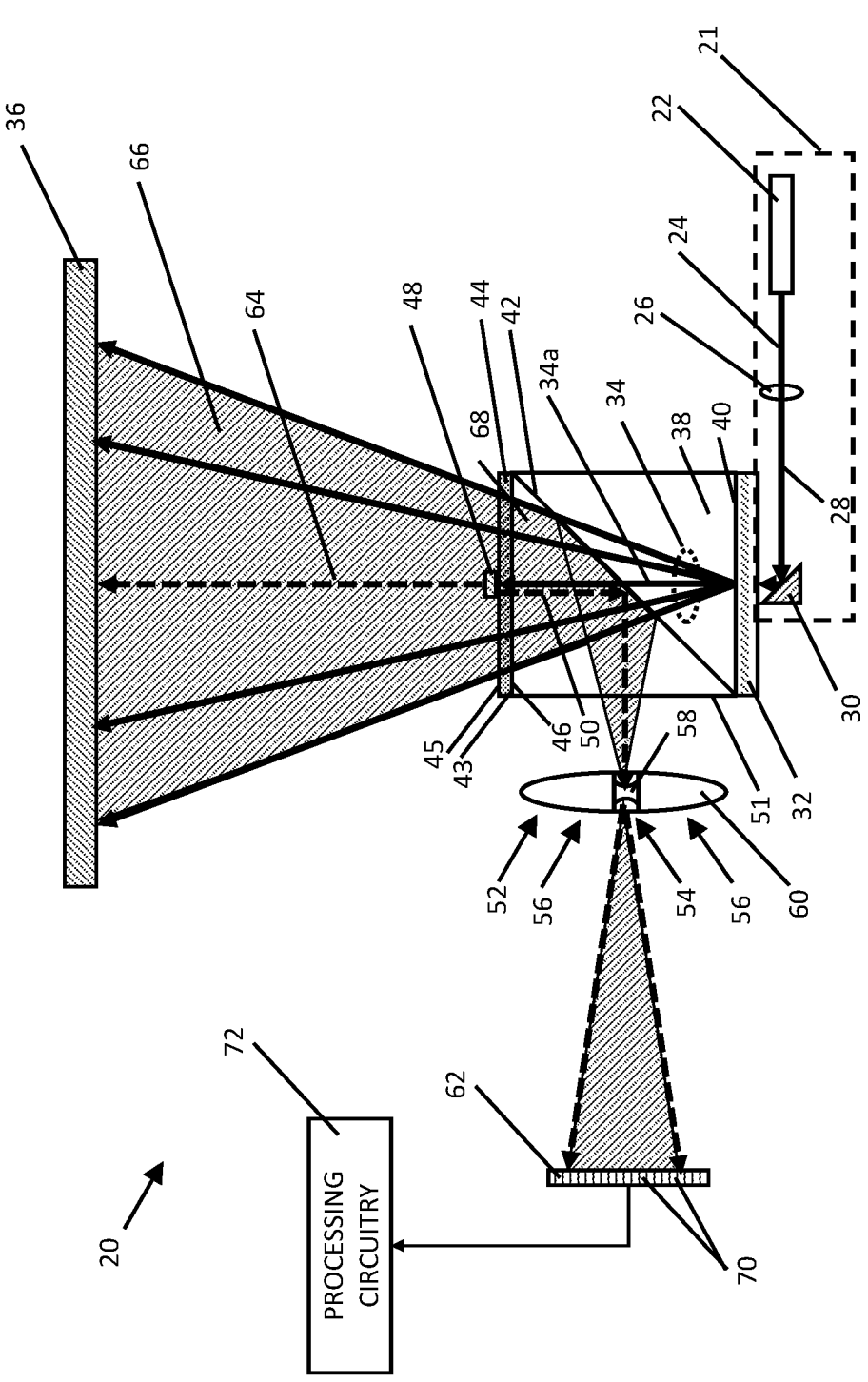
FIG. 1 is a schematic side view of a staring FMCW LiDAR system, in accordance with an embodiment of the invention.

In an FMCW LiDAR, the signal indicating the range of a target results from the optical interference between a beam reflected from the target and the local beam. For acquiring range data across an area of the target, the LiDAR beam is commonly scanned over the target in a raster pattern, with a fast scan along the raster lines and a slow scan from line to line, and the reflected beam is projected to a single detector. The fast scan is implemented, for example, using a high-speed MEMSs mirror or a rotating polygon mirror. Such scanning LiDAR systems require complex optomechanical structures with a large volume. Moreover, the high scan speeds with short integration times require a light source with a high optical power.

In contrast to scanning LiDAR, staring LiDAR utilizes a stationary detector array, onto which the target is imaged, rather than scanning with a single detector. In order to illuminate a target with a sufficiently wide field-of-view (FOV), the beam of optical radiation emitted by the light source of the LiDAR (typically a laser) is expanded over the angular sensing range. Diffractive optical elements (DOEs) are well suited for this purpose, but they tend to transmit a large portion of the radiation incident on the DOE into the zero diffracted order, resulting in non-uniform illumination of the FOV of the LiDAR.

The embodiments of the present invention that are described herein take advantage of this seemingly problematic property of DOE illumination by deflecting a portion of the zero order diffraction of the DOE for use as the local beam. Using this approach, the target can be illuminated by the diffraction orders of the DOE over a wide FOV, while making efficient use of the optical power in the zero order, as well.

In the disclosed embodiments, a range sensing apparatus comprises a radiation source, a DOE, an array of optical detectors, a beamsplitter, a reflector, objective optics, and processing circuitry. The radiation source emits a beam of coherent optical radiation. The beamsplitter is positioned to direct the beam toward a target while directing the optical radiation reflected from the target toward the array of optical detectors. The DOE diffracts the beam into multiple orders, including a zero order, at different beam angles.

The reflector is positioned in the path of the beam following the DOE and the beamsplitter so as to intercept and reflect at least a part of the zero order toward the beamsplitter. The reflected zero order is reflected by the beamsplitter toward the array of optical detectors and serves as the local beam for purposes of coherent detection. The objective optics image the target onto the array of optical detectors while spreading the local beam across the array. The processing circuitry processes the electrical signals output by the optical detectors to extract the beat signal that arises due to the optical interference between the reflected radiation and the local beam.

In some embodiments, the radiation source comprises a narrow-linewidth laser, which emits a polarized, collimated, and RF-modulated coherent beam of optical radiation through the DOE into a polarizing beamsplitter (PBS). The DOE is designed and positioned so that the fan of the diffracted beams covers the required FOV of the target with a beam-angle separation for sufficient spatial sampling of the target. A small mirror, which may be partially or fully reflecting, is positioned to intercept only the zero diffracted order and to reflect a portion of it back to the PBS to serve as the local beam. When the mirror is partially reflecting, it transmits the remaining energy in the zero order toward the target. A quarter-wave ($\lambda$/4) plate between the PBS and the mirror turns, after a double-pass, the linear polarization of the local beam by 90° and causes it to be reflected by the PBS toward the detector array. The reflected local beam is incident on a central zone of objective optics, which comprises a negative lens and or another optical element, which causes the local beam to diverge and to spread across the detector array.

The remaining orders, not intercepted by the mirror, are directed toward a target. The optical radiation is reflected from the target back through the $\lambda$/4-plate into the PBS, and reflected—after a double-pass similar to the local beam—by the PBS toward the detector array. A positive lens in a peripheral zone of the objective optics forms an image of the target on the detector array and thus focuses each of the reflected diffraction orders onto a respective detector or group of detectors in the array. The reflected optical radiation and the local beam interfere optically, and the detector array outputs beat signals due to the frequency difference between the reflected optical radiation and the local beam. The processing circuitry extracts the beat signal from each pixel and thus estimates the range and velocity of each point on the target that is conjugate to a respective pixel.

The optomechanics of the system are simple and compact, requiring no moving parts. By adding a folding mirror between the laser and the PBS, the entire optical system may be made even more compact. Utilizing the zero order diffraction from the DOE as the local beam is an economical use of the diffracted energy, as commonly this order has an undesirably large portion of the energy.

System Description

FIG. 1 is a schematic side view of a staring FMCW LiDAR system 20, in accordance with an embodiment of the invention.

A light source 21 comprises a coherent radiation source 22, such as a distributed-feedback (DFB) laser, a lens 26, and a folding mirror 30. Radiation source 22 emits a linearly polarized beam 24 of coherent optical radiation, which is modulated with an RF chirp. (Although radiation source 22 is shown as a single unit, it may alternatively comprise separate units for the laser and for the RF-modulator.) Beam 24 is collimated by lens 26 into a beam 28, and folded by 90° by folding mirror 30. (Folding mirror 30 is not essential for the functioning of system 20, but contributes to the construction of a compact system.) After folding, beam 28 is directed into a DOE 32, comprising a Dammann grating, for example, which diffracts the beam into multiple orders of diffracted beams 34, including a zero order diffracted beam 34*a*. For the sake of clarity, only a few orders of diffracted beams 34 are shown. DOE 32 is designed so as to fill the FOV (angular range) of system 20, i.e., to cover the desired angular extent of a target 36. DOE 32 is designed to produce a sufficiently large number of diffracted orders for mapping the range of target 36 with a desired spatial resolution.

In an alternative embodiment (not shown), DOE 32 may also be designed to collimate the optical radiation emitted by radiation source 22, thus obviating the use of lens 26.

Diffracted beams 34 are projected from DOE 32 into a PBS 38 through a first face 40 of the PBS, wherein a polarizing internal beamsplitting surface 42 of the PBS transmits the linear polarization emitted by light source 21 and reflects the orthogonal linear polarization. DOE 32 may conveniently be fixed to or otherwise mounted on first face 40. A λ/4-plate 44 is mounted on PBS 38, for example with an inner side 43 of the λ/4-plate contacting or in proximity to a second face 46 of the PBS. Diffracted beams 34 pass through λ/4-plate 44, which converts the linear polarization of each beam to circular polarization. Zero order diffracted beam 34a impinges on a small partial reflector 48, mounted on an outer side 45 of λ/4-plate 44.

Partial reflector 48 reflects a portion of zero order beam 34a, thus generating a local beam 50 and directing it (for a second pass) through λ/4-plate 44 into PBS 38. This second pass through λ/4-plate 44 causes local beam 50 to assume a linear polarization state, which is orthogonal to the initial linear polarization of beam 34a. Thus local beam 50 is reflected by beamsplitting surface 42 of PBS 38, exits from the PBS through a third face 51, and is directed toward a central zone 54 of objective optics 52. In the present embodiment, central zone 54 has a different focal power from a peripheral zone 56 of objective optics 52. For example, central zone 54 comprises a negative (diverging) lens 58, which spreads local beam 50 across an array of optical detectors 62.

In other embodiments (not shown), negative lens 58 in central zone 54 may be replaced by a positive lens with short focal length or by a diffuser, to spread local beam 50 across detector array 62. In yet another embodiment, negative lens 58 may be replaced by a DOE to spread local beam 50. This DOE may further be designed to impose a pre-defined profile, such as a top-hat profile, on the irradiance of local beam 50 on detector array 62.

Partial reflector 48 has an angular extent such that it intercepts only zero order beam 34a, and all other diffracted beams 34 pass by the reflector to illuminate target 36. A portion of zero order beam 34a is transmitted by reflector 48 into a beam 64, which also illuminates target 36. The beams illuminating target 36 are reflected back from the target as reflected optical radiation 66 toward λ/4-plate 44 and PBS 38, wherein the reflected optical radiation may comprise both retroreflections and diffuse reflections of beams 34.

Reflected radiation 66 passes through λ/4-plate 44 to become radiation 68, which is linearly polarized (similarly to local beam 50) in a direction orthogonal to the initial linear polarization of beams 34. Linearly polarized radiation 68 is reflected by PBS 38 through third face 51 toward objective optics 52. Peripheral zone 56 of objective optics 52, comprising a positive lens 60, images target 36 onto detector array 62, thus focusing radiation 68 onto the array. (Although reflected radiation 66 and 68 is shown schematically in the figure, for the sake of simplicity, to follow the angular paths of beams 34, in reality the reflected radiation is typically diffuse and fills the area of positive lens 60 in peripheral zone 56.) Due to its small size, reflector 48 blocks only a negligible portion of reflected radiation 66 (for example on the order of 1%.)

Radiation 68 and the expanded local beam 50 interfere across the plane of detector array 62. Each individual pixel 70 of the array outputs an RF signal at a beat frequency that is indicative of the range and velocity of the point on target 36 that is conjugate to the specific pixel. Processing circuitry 72 extracts the beat signal from each pixel 70 and processes these signals to find the range and velocity of the conjugate points on the target. Processing circuitry 72 typically comprises analog and digital signal processing components for processing the beat signals. Additionally or alternatively, at least some of the functions of processing circuitry 72 may be carried out in software, for example by a programmable microprocessor or microcontroller.

Figure 2:
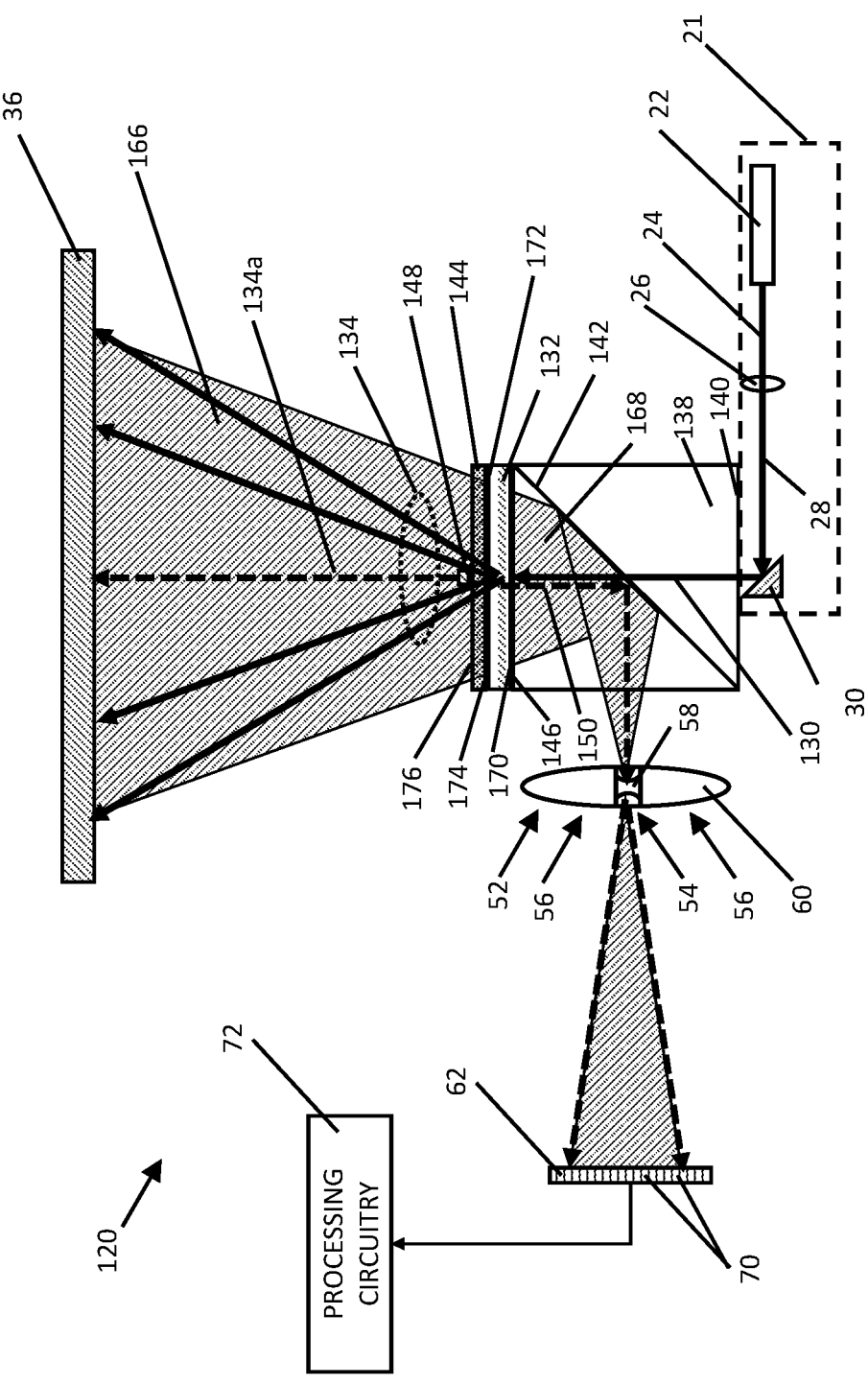
FIG. 2 is a schematic side view of a staring FMCW LiDAR system, in accordance with another embodiment of the invention.

FIG. 2 is a schematic side view of a staring FMCW LiDAR system 120, in accordance with another embodiment of the invention. In comparison with LiDAR system 20 (FIG. 1), system 120 is capable of covering a wider FOV. LiDAR system 120 utilizes a DOE 132, a PBS 138, a λ/4-plate 144, and a partial reflector 148, wherein the DOE is mounted between the PBS and the λ/4-plate (as opposed to mounting it below the PBS as in system 20). These components may be similar or identical to the corresponding components in system 20. Light source 21 with its components, objective optics 52, detector array 62, and processing circuitry 72 are substantially identical to those in system 20.

Beam 28, emitted by light source 21, enters PBS 138 through a first face 140, traverses the PBS as a beam 130, and exits through a second face 146. Beam 130 then enters DOE 132, which is mounted with an inner side 170 on second face 146 of PBS 138, and is diffracted by the DOE into diffracted beams 134. Diffracted beams 134 exit DOE 132 through an outer side 172, and enter λ/4-plate 144, which is mounted with an inner side 174 on the outer side of the DOE. (In an alternative embodiment, DOE 132 may be configured, in addition to generating beams 134, to serve as a λ/4-plate, thus obviating the use of a separate λ/4-plate 144.) The zero order of diffracted beams 134 impinges on a partial reflector 148, mounted on outer side 176 of λ/4-plate 144. (The zero diffraction order is a continuation of beam 130. For the sake of clarity, it is not shown inside DOE 132 nor inside λ/4-plate 144.)

Similarly to system 20, the reflection of the zero diffraction order from partial reflector 148 generates a local beam 150, which is directed (for a second pass) through λ/4-plate 144 into PBS 138. Local beam 150 is reflected by a beamsplitting surface 142 of PBS 138, exits from PBS 138 through a third face 151 into central zone 54 of objective optics 52, and is spread by the combined effect of DOE 132 and negative lens 58 across detector array 62.

Variations similar to those in system 20 may be implemented in central zone 54.

Similarly to system 20, diffracted beams 134, including beam 134a (the portion of beam 130 that is transmitted by partial reflector 148), illuminate target 36. Reflected optical radiation 166 from target 36 passes through λ/4-plate 144 and DOE 132 into PBS 138, forming linearly polarized optical radiation 168, which is reflected by beamsplitting surface 142 and focused by objective optics 52 onto detector array 62. Processing circuitry 72 extracts the beat signals and computes ranges and velocities of target 36 as in the preceding embodiment.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. Range sensing apparatus, comprising:
   a radiation source, configured to emit a beam of coherent optical radiation;
   an array of optical detectors;

a beamsplitter positioned to direct the beam toward a target while directing the optical radiation reflected from the target toward the array of optical detectors;

a diffractive optical element (DOE) configured to diffract the beam into multiple orders, including a zero order, propagating toward the target at different, respective angles;

a reflector configured to intercept and reflect at least a part of the zero order toward the beamsplitter, thereby generating a local beam, which is reflected by the beamsplitter toward the array of optical detectors;

objective optics, configured to image the target onto the array of optical detectors while spreading the local beam across the array; and processing circuitry, configured to extract a beat signal from electrical signals output by the optical detectors in response to an optical interference between the optical radiation reflected from the target and the local beam.

2. The apparatus according to claim 1, wherein a frequency modulation is applied to the coherent optical radiation emitted by the radiation source, and the beat signal is indicative of a frequency difference between the coherent optical radiation reflected from the target and the local beam.

3. The apparatus according to claim 2, wherein the processing circuitry is configured to analyze the beat signal to find a range of the target.

4. The apparatus according to claim 1, wherein the beamsplitter comprises a beamsplitter cube, wherein the radiation source is configured to direct the optical radiation into the beamsplitter cube through a first face of the beamsplitter cube, whereby the optical radiation exits the beamsplitter cube toward the target through a second face of the beamsplitter cube, and wherein the array of optical detectors is configured to receive the optical radiation that has been reflected from the target, entered the beamsplitter cube through the second face, and exited through a third face of the beamsplitter cube.

5. The apparatus according to claim 4, wherein the DOE is positioned between the radiation source and the beamsplitter cube and is configured to direct the multiple orders into the beamsplitter cube.

6. The apparatus according to claim 5, wherein the DOE is mounted on the first face of the beamsplitter cube.

7. The apparatus according to claim 4, wherein the DOE is positioned to diffract the beam into the multiple orders after the beam has passed through the first and second faces of the beamsplitter cube.

8. The apparatus according to claim 4, wherein the beamsplitter cube comprises a polarizing internal beamsplitting surface, and wherein the apparatus comprises a quarter-wave plate having an inner side mounted on the second face of the beamsplitter cube, and wherein the reflector is disposed on an outer side of the quarter-wave plate.

9. The apparatus according to claim 1, wherein the reflector has an angular extent selected so as to intercept only the zero order, while the remaining orders pass outside the angular extent of the reflector.

10. The apparatus according to claim 1, wherein the DOE is further configured to collimate the beam of optical radiation.

11. The apparatus according to claim 1, wherein the reflector is partially reflective, whereby a portion of the zero order passes through the reflector toward the target.

12. The apparatus according to claim 1, wherein the objective optics comprise a central zone, which is configured to spread the local beam across the array, and a peripheral zone, surrounding the central zone, which is configured to image the target onto the array.

13. The apparatus according to claim 12, wherein the central zone comprises a further DOE.

14. The apparatus according to claim 13, wherein the further DOE is configured to apply a top-hat profile to the local beam.

15. The apparatus according to claim 12, wherein the central zone comprises a diffuser.

16. The apparatus according to claim 12, wherein the peripheral zone comprises a first lens with a first focal power, wherein the central zone comprises a second lens with a second focal power, different from the first focal power.

17. A method for optical sensing, comprising:

directing a beam of coherent optical radiation toward a beamsplitter;

positioning the beamsplitter to direct the beam toward a target while directing the optical radiation reflected from the target toward an array of optical detectors;

applying a diffractive optical element (DOE) to diffract the beam into multiple orders, including a zero order, propagating toward the target at different, respective angles;

intercepting and reflecting at least a part of the zero order toward the beamsplitter, thereby generating a local beam, which is directed by the beamsplitter toward an array of optical detectors;

imaging the target through the beamsplitter onto the array of optical detectors while spreading the local beam across the array; and extracting a beat signal from electrical signals output by the optical detectors response to an optical interference between the optical radiation reflected from the target and the local beam.

18. The method according to claim 17, wherein positioning the beamsplitter comprises positioning a beamsplitter cube, so that the beam of the coherent optical radiation passes into the beamsplitter cube through a first face of the beamsplitter cube, whereby the optical radiation exits the beamsplitter cube toward the target through a second face of the beamsplitter cube, and wherein imaging the target comprises directing the optical radiation that has been reflected from the target and entered the beamsplitter cube through the second face, to exit through a third face of the beamsplitter cube onto the array of optical detectors.

19. The method according to claim 18, wherein applying the DOE comprises positioning the DOE between a radiation source and the beamsplitter cube so as to direct the multiple orders into the beamsplitter cube.

20. The method according to claim 18, wherein applying the DOE comprises positioning the DOE to diffract the beam into the multiple orders after the beam has passed through the first and second faces of the beamsplitter cube.

* * * * *